United States Patent [19]

Komatsu et al.

[11] 3,953,409
[45] Apr. 27, 1976

[54] PROCESS FOR PRODUCING CONJUGATED DIOLEFINIC POLYMERS

[75] Inventors: Koei Komatsu; Shigeyuki Nishiyama, both of Yokohama; Nobuyuki Sakabe, Kawasaki; Akira Kogure, Tokyo, all of Japan

[73] Assignee: Japan Synthetic Rubber Co., Ltd., Tokyo, Japan

[22] Filed: May 21, 1970

[21] Appl. No.: 39,569

[30] Foreign Application Priority Data

May 31, 1969   Japan.................................. 44-41718
June 30, 1969   Japan.................................. 44-50954
Aug. 25, 1969   Japan.................................. 44-66464

[52] U.S. Cl.................................. 526/82; 526/249; 526/250; 526/296; 526/294; 526/332; 526/336; 526/338; 526/345; 526/347; 526/173
[51] Int. Cl.$^2$................ C08F 236/16; C08F 236/18
[58] Field of Search............. 260/83.7, 94.2 T, 80.7, 260/82.1

[56] References Cited
UNITED STATES PATENTS

| | | | |
|---|---|---|---|
| 2,380,356 | 7/1945 | Youker.............................. | 260/80.7 |
| 2,394,406 | 2/1946 | Schoenfeld........................ | 260/80.7 |
| 2,463,573 | 3/1949 | Stanton............................. | 260/80.7 |
| 2,463,574 | 3/1949 | Stanton............................. | 260/80.7 |
| 3,423,379 | 1/1969 | Grinninger et al................. | 260/94.2 |
| 3,435,011 | 3/1969 | Uraneck............................ | 260/80.7 |
| 3,448,093 | 6/1969 | Grinninger et al................. | 260/94.2 |
| 3,518,238 | 6/1970 | Onishi............................... | 260/94.2 |
| 3,535,296 | 10/1970 | Broering.......................... | 260/94.2 |
| 3,836,513 | 9/1974 | Pyke................................ | 260/94.2 T |

FOREIGN PATENTS OR APPLICATIONS

782,970   9/1957   United Kingdom................ 260/94.2

*Primary Examiner*—Paul R. Michl
*Attorney, Agent, or Firm*—Haseltine, Lake & Waters

[57] ABSTRACT

Conjugated diolefinic polymers having a molecular weight of less than 1,000,000 can be produced at high polymerization rates and in high yields by polymerizing a conjugated diolefin or copolymerizing a conjugated diolefin with a vinyl aromatic hydrocarbon in the presence of an alfin catalyst, in which as a molecular weight regulator is used a halogenated unsaturated hydrocarbon represented by the formula,

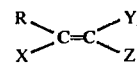

wherein R is an alkyl group having 1 to 7 carbon atoms, a vinyl group, a phenyl group, an alkyl-substituted phenyl group, a halogen atom or a hydrogen atom, and X, Y and Z which may be same or different are individually a hydrogen atom, a halogen atom or an alkyl group having 1 to 4 carbon atoms, at least one of the R, X, Y and Z being a halogen atom. The above-mentioned molecular weight regulator not only displays a prominent molecular weight-regulating effect, even when used in a small amount, but also is easily commercially obtainable and inexpensive, so that marked commercial advantages can be attained according to the above-mentioned process.

19 Claims, No Drawings

PROCESS FOR PRODUCING CONJUGATED DIOLEFINIC POLYMERS

The present invention relates to a process for producing polymers of conjugated diolefins or copolymers of conjugated diolefins with vinyl aromatic hydrocarbons. More particularly, the invention pertains to a process for homopolymerizing conjugated diolefins or copolymerizing the same with vinyl aromatic hydrocarbons in the presence of an alfin catalyst using a halogenated unsaturated hydrocarbon as a molecular weight regulator.

A process for homopolymerizing conjugated diolefins or copolymerizing the same with vinyl aromatic hydrocarbons in the presence of an alfin catalyst has already been known. Alfin catalysts are markedly high in polymerization rate and polymerization yield, and give polymers excellent in such properties as abrasion resistance, tensile strength and flex-crack resistance, in general. However, the polymers are excessively high in molecular weight (ordinarily 2 million to 12 million), so that according to a conventional solution-polymerization, the solution viscosity of the reaction system becomes markedly high even when the monomer concentration is made extremely low, with the result that the transfer of material and heat in the reaction system becomes difficult. Thus, it has been substantially impossible to practice the above-mentioned process on a commercial scale. On the other hand, the alfin polymers, despite their having such excellent properties as mentioned above so as to be suitable for use as synthetic rubbers, are extremely difficult to process because of their excessively high molecular weights.

Accordingly, the polymers have not been deemed as materials suitable for use as practical synthetic rubbers, though many studies have been made with respect thereto. In view of the above, coupled with the difficulty in steps for production thereof, synthetic rubbers using alfin catalysts have not been produced on a commercial scale hitherto.

In order to overcome the above-mentioned difficulties, many attempts have been made to lower the molecular weights of the polymers by adding molecular weight regulators suitable for use in combination with the alfin catalysts. However, almost all of these attempts have failed to give satisfactory effects. Molecular weight regulators should be substances which can lower to less than 1 million the molecular weights of polymers obtained by use of ordinary alfin catalysts and which have no marked influence on the polymerization rates, the polymerization conversions, and the gels and micro-structures of the polymers. As molecular weight regulators having such properties as mentioned above, there have heretofore been known dihydro aromatic compounds [Japanese Patent Publication No. 15,043/62, and V. L. Hamseley et al.: "Rubber Age", Vol. 94, No. 1, page 87 (October, 1963)]. Further, as molecular weight regulators which are more excellent than those mentioned above, there have been proposed 1,4-pentadienes and 1,5-hexadienes. Among these, 1,4-pentadienes are particularly effective. However, they are difficult to obtain commercially, and therefore, problems still remain for the commercial scale production of alfin rubbers.

An object of the present invention is to provide a process for producing polymers of conjugated diolefins or copolymers of conjugated diolefins with vinyl aromatic hydrocarbons which have a suitably controlled molecular weight.

Another object of the invention is to provide a process for polymerizing conjugated diolefins or copolymerizing conjugated diolefins with vinyl aromatic hydrocarbons in the presence of an alfin catalyst using a halogenated unsaturated hydrocarbon as a molecular weight regulator.

A further object of the invention is to provide a process for producing polymers of conjugated diolefins or copolymers of conjugated diolefins and vinyl aromatic hydrocarbons which have a molecular weight of less than 1 million by use of an easily obtainable and inexpensive molecular weight regulator.

Other objects and effects of the invention will become apparent for those skilled in the art from the following description.

In accordance with the present invention, there is provided a process for polymerizing at least one conjugated diolefin or copolymerizing at least one conjugated diolefin with at least one vinyl aromatic hydrocarbon in a hydrocarbon solvent or a halogenated hydrocarbon solvent with an alfin catalyst, characterized in that the polymerization or copolymerization is effected in the presence, as a molecular weight regulator, of a halogenated unsaturated hydrocarbon having the formula,

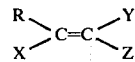

wherein R is an alkyl group having 1 to 7 carbon atoms, a vinyl group, a phenyl group, an alkyl-substituted phenyl group, a halogen atom or a hydrogen atom, and X, Y and Z, which may be the same or different, are individually a hydrogen atom, a halogen atom or an alkyl group having 1 to 4 carbon atoms, at least one of the R, X, Y and Z being a halogen atom.

Typical examples of the halogenated unsaturated hydrocarbon used as the molecular weight regulator in the present invention include vinyl chloride, vinyl bromide, vinyl iodide, vinyl fluoride, vinylidene chloride, vinylidene bromide, vinylidene iodide, vinylidene fluoride, cis-propenyl chloride, trans-propenyl chloride, isopropenyl chloride, propenyl bromide, isopropenyl bromide, propenyl iodide, isopropenyl iodide, propenyl fluoride, isopropenyl fluoride, 1,2-dichloroethylene, 1,2-dibromoethylene, 1,2-diiodoethylene, trichloroethylene, tribromoethylene, triiodoethylene, tetrachloroethylene, tetrabromoethylene, tetraiodoethylene, tetrafluoroethylene, 1-chloro-2-fluoroethylene, 1-chloro-2-bromoethylene, 1-chloro-1-fluoroethylene, 1-chloro-1-butene, 1-bromo-1-butene, 1-iodo-1-butene, 2-chloro-1-butene, 2-bromo-1-butene, 2-iodo-1-butene, 1-chloro-1-pentene, 1-bromo-1-pentene, 1-iodo-1-pentene, 1-fluoro-1-pentene, 2-chloro-1-pentene, 2-bromo-1-pentene, 1-chloro-1-hexene, 1-bromo-1-hexene, 2-chloro-1-hexene, 1-chloro-1-heptene, 1-bromo-1-heptene, 2-chloro-1-heptene, 2-chloro-1-octene, 2-chloro-1-nonene, 1,1-dichloro-1-propene, 1,1-dibromo-1-propene, 1,1-dichloro-1-butene, 1,1-dichloro-1-pentene, α-chlorostyrene, α-bromostyrene, α-iodostyrene, β-chlorostyrene, β-bromostyrene, β-iodostyrene, α-chloro-2-methylstyrene, β-chloro-2-methylstyrene, α-bromo-3-methylstyrene, β-bromo-3-methylstyrene, α-iodo-4-methylstyrene, β-iodo-4-methylstyrene, α-chloro-2,4-dimethylstyrene, β- chloro-2,4-dimethylstyrene, α-bromo-2,5-dimethylstyrene, β-bromo-2,5-dimethylstyrene, α-chloro-3,4-dimethylstyrene, β-chloro-3,4-dimethylstyrene, α-chloro-2,4,6-trimethylstyrene, β-chloro-2,4,6-trimethylstyrene, α-bromo-2,4,5-trimethylstyrene, β-bromo-2,4,5-trimethylstyrene, α-chloro-4-ethylstyrene, β-chloro-4-ethylstyrene, α-bromo-4-ethylstyrene, β-bromo-4-ethylstyrene, β-chloro-4-n-butylstyrene, β-chloro-4-n-hexylstyrene, β-bromo-4-n-octylstyrene, chloroprene, 2-chlorobutene-2, 1,2-dichlorobutene-2, α-methyl-β-chlorostyrene and α-chloro-β-methylstyrene.

In the present invention, the above-mentioned molecular weight regulator is used in a proportion of 0.01 to 10,000 mmol., preferably 0.05 to 1,000 mmol., per 100 g. of the monomer. The manner of addition of the molecular weight regulator is not particularly restricted. Preferably, however, the molecular weight regulator is added to the monomer before contacting the monomer with the catalyst, and then the resulting mixture is diluted with the polymerization solvent to a concentration of, ordinarily, 0.1 to 1.0 mol/liter.

A typical alfin catalyst employed in the present invention is a ternary mixture or complex compound of allyl sodium, sodium isopropoxide and sodium chloride which is obtained by reacting n-amyl chloride with a sodium dispersion with stirring in a hydrocarbon solvent, and then reacting the resulting n-amyl sodium with isopropyl alcohol and propylene successively. The allyl sodium may, of course, be replaced by any of benzyl sodium, xylyl sodium, pentenyl sodium, cymyl sodium and mesityl sodium, as is well known [refer to, for example Leo Reion: "Polymerization by Organometallic Compounds", pages 402–430 (1966), Internation Publishers]. Further, the isopropoxide may be replaced by 2-butoxide, 3-pentoxide, cyclopentoxide, cyclobutoxide or t-butoxide, and the sodium salt may be replaced by potassium salt, lithium salt or the like alkali metal salt.

The conditions for the preparation of the alfin catalyst and the ratio of the individual components in the catalyst may, of course, be freely varied according to known processes.

Monomers which can be polymerized according to the present invention are conjugated dienes, such as 1,3-butadiene, isoprene, piperylene, 2,3-dimethyl-1,3-butadiene and the like. These conjugated dienes may be used either alone or in admixture of 2 or more. Further, at least one of these conjugated dienes may be copolymerized with at least one of such vinyl aromatic hydrocarbons as styrene, divinylbenzene, α-methylstyrene, β-methylstyrene, 3-vinyltoluene, 1-vinylnaphthalene, 2-vinylnaphthalene, p-methoxystyrene, p-bromostyrene and the like.

The polymerization can be effected, either continuously or in a batch-wise manner, by contacting according to a process known per se the monomer with the alfin catalyst in a hydrocarbon solvent in the presence of the molecular weight regulator.

The polymerization temperature is not particularly limited, but is ordinarily about −50°C. to +150°C., preferably about −20°C. to +80°C. The pressure of the reaction system may be any pressure so far as the reaction mixture can be maintained in a liquid phase, and is ordinarily about 1 to 5 atm.

It is desirable that the polymerization reaction is effected in an atmosphere of an inert gas such as argon, helium, nitrogen or the like.

The amount of the catalyst in terms of allyl sodium is about 0.01 to 500 mmol., preferably 0.1 to 100 mmol., per 100 g. of the monomer.

The amount of the hydrocarbon or halogenated hydrocarbon solvent used as the polymerization solvent is 1 to 100 times the weight of the monomer employed. Examples of the hydrocarbon solvent include aliphatic hydrocarbons such as n-pentane, iso-pentane, n-hexane, n-heptane, n-octane and iso-octane; alicyclic hydrocarbons such as cyclohexane and cyclooctane; aromatic hydrocarbons such as benzene, toluene and xylene; and partially hydrogenated aromatic hydrocarbons such as tetralin. Examples of the halogenated hydrocarbon solvent include methylene chloride, chloroform, carbon tetrachloride, trichlene, perchloroethylene, chlorobenzene, bromobenzene and chlorotoluene. These solvents may be used either alone or in admixture of 2 or more.

When the polymerization reaction has progressed to a desired stage, a catalyst-inactivating agent such as water, alcohol or the like is added to the reaction mixture to terminate the reaction, and then the solvent is removed according to an ordinary procedure to obtain a desired polymer or copolymer. It is desirable that prior to removal of the solvent, an antioxidant such as phenyl-β-naphthylamine is added to the reaction mixture.

The present invention is illustrated in further detail below with reference to examples, but the invention is not limited to these examples so far as it does not deviate from the gist thereof. In the examples, the intrinsic viscosity of each polymer was measured in toluene at 30°C. by use of a Ubbelohde's viscometer; the microstructure of polybutadiene was measured according to the infrared absorption spectrum method proposed by D. Morero [Chim. e Ind., 41, 758 (1959)]; and the amount of styrene in the butadienestyrene copolymer was measured in such a manner that in a messflask, 100 mg. of a sample was dissolved in carbon disulfide to make the total volume 25 ml. and the amount was calculated according to the base line method from the absorbancy at 699 cm$^{-1}$ of the infrared absorption spectrum thereof.

The alfin catalyst used in each of the examples and the reference examples set forth below was prepared in the following manner:

300 g. of dry n-hexane was fed to a four-necked flask equipped with a stirrer, a reflux condenser, a thermometer and an external cooling bath. To the flask was added 23 g. (1.0 g. atom) of sodium which had been finely divided to a size of about 2 microns, and the content of the flask was cooled to −10°C. Subsequently, 53.3 g. (0.5 mol) of dry n-amyl chloride was added gradually with mild stirring. During this time, the reaction system was kept at −10°C. After completion of the addition, the stirring was further continued for about 1 hour. Thereafter, 15 g. (0.25 mol) of dry isopropyl alcohol was gradually added with stirring, and then the stirring was further continued for an additional 45 minutes. After introducing an excess of dry propylene into the reaction system, the reaction temperature was maintained at −10°C. until the reflux of the propylene took place. Thereafter, the temperature was gradually elevated and finally brought up to 25°C. In this state, the stirring was continued for about 2 hours, and then, the excess propylene was removed from the system. To this was added dry n-hexane to make the total amount 800 ml. All the above operations were effected in a nitrogen gas atmosphere.

EXAMPLE 1

17.5 g. (27 ml.) of dry n-hexane was fed to a 100-ml. glass pressure bottle, which had sufficiently been filled with high purity nitrogen gas, and the bottle was tightly closed with a crown cap. To the bottle, 0.1 mmol. (0.00625 g.) of vinyl chloride and 5.4 g. (100 mmol.) of butadiene were added by means of a syringe, and then 3 ml. of an alfin catalyst solution containing 0.3 mmol. of allyl sodium per ml. was added.

After shaking the bottle at room temperature for about 3 hours, the crown cap of the bottle was removed, and the content of the bottle was charged into 200 ml. of isopropyl alcohol containing 2 % by weight of an antioxidant, whereby the polymerization product was coagulated. Subsequently, the product was subjected 2 times to water-washing to remove the catalyst residue; washed with isopropyl alcohol and then dried for 24 hours under reduced pressure at 40°C. to obtain a polybutadiene.

The yield of the thus obtained polybutadiene was 70 % by weight and, according to infrared analysis, it was found that the polymer was composed of 60 % of trans-configuration, 37 % of vinyl configuration and 3 % of cis-configuration. The polymer showed an intrinsic viscosity of 3.2 and had a molecular weight of 385,000.

1 to obtain a polymer having an intrinsic viscosity of 22.0 and a molecular weight of 8,650,000.

EXAMPLES 2–7

In order to examine the effects of the invention in the cases where the amount of the vinyl chloride was varied, the operations of Example 1 were repeated using the vinyl chloride in such amounts as shown in Table 1. The results obtained were as shown in Table 1.

Table 1

| Example No. | n-Hexane (g) | Vinyl chloride (mM) | Butadiene (g) | Polymer yield (% by weight) | Intrinsic viscosity | Molecular weight × $10^{-4}$ |
|---|---|---|---|---|---|---|
| 2 | 17.5 | 0.045 | 5.4 | 78 | 9.2 | 245 |
| 3 | 17.5 | 0.090 | 5.4 | 55 | 5.3 | 71 |
| 4 | 17.5 | 0.10 | 5.4 | 66 | 3.2 | 35 |
| 5 | 17.5 | 0.30 | 5.4 | 57 | 2.5 | 25 |
| 6 | 17.5 | 0.60 | 5.4 | 45 | 1.8 | 16 |
| 7 | 17.5 | 1.00 | 5.4 | 24 | 1.4 | 12 |

The micro-structure of the polymer obtained in each of Examples 2–7 was composed of 60 % of trans, 37 % of vinyl and 3 % of cis.

EXAMPLES 8–10

Butadiene was polymerized in the same manner as in Example 1, except that vinylidene chloride was used as the molecular weight regulator in place of the vinyl chloride. The results obtained were as shown in Table 2.

Table 2

| Example No. | n-Hexane (g) | Vinylidene chloride (mM) | Butadiene (g) | Polymer yield (% by weight) | Intrinsic viscosity | Molecular weight × $10^{-4}$ |
|---|---|---|---|---|---|---|
| 8 | 17.5 | 0.045 | 5.4 | 85 | 6.4 | 91 |
| 9 | 17.5 | 0.090 | 5.4 | 57 | 2.4 | 22 |
| 10 | 17.5 | 0.225 | 5.4 | 25 | 1.1 | 10 |

EXAMPLES 11–13

Polymerization was effected in the same manner as in Example 1, except that in place of the butadiene was used isoprene in such amounts as shown in Table 3, and the vinyl chloride was used in such amounts as shown in Table 3. The results obtained were as set forth in Table 3.

Table 3

| Example No. | n-Hexane (g) | Vinyl chloride (mM) | Isoprene (g) | Polymer yield (% by weight) | Intrinsic viscosity |
|---|---|---|---|---|---|
| Control | 17.5 | 0 | 5.4 | 99 | 20.0 |
| 11 | 17.5 | 0.045 | 5.4 | 90 | 8.8 |
| 12 | 17.5 | 0.090 | 5.4 | 81 | 7.4 |
| 13 | 17.5 | 0.225 | 5.4 | 25 | 1.8 |

Reference Example 1

The same procedure as in Example 1 was repeated, except that the vinyl chloride was not used. After a polymerization time of 15 minutes the reaction mixture became a semi-solid material having no fluidity. This material was treated in the same manner as in Example

EXAMPLES 14–18

Polymerization was effected in the same manner as in Example 1, except that butadiene and styrene were used in such proportions as shown in Table 4. The results obtained were as set forth in Table 4.

Table 4

| Example No. | n-Hexane (g) | Vinyl chloride (mM) | Butadiene (g) | Styrene (g) | Polymer yield (% by weight) | Styrene* content in polymer (% by weight) | Intrinsic viscosity |
|---|---|---|---|---|---|---|---|
| Control | 17.5 | 0 | 4.05 | 1.35 | 100 | — | 18.0 |
| 14 | 17.5 | 0.090 | 4.05 | 1.35 | 73 | 36 | 2.4 |
| 15 | 17.5 | 0.225 | 4.05 | 1.35 | 65 | 38 | 1.7 |
| 16 | 17.5 | 0.45 | 4.05 | 1.35 | 54 | 43 | 1.1 |
| 17 | 17.5 | 0.225 | 2.70 | 2.70 | 91 | 56 | 1.0 |
| 18 | 17.5 | 0.225 | 1.35 | 4.05 | 98 | 71 | 1.1 |

*The styrene content (% by weight) was calculated according to infrared analysis of unfractionated polymer.

EXAMPLES 19–21

Polymerization was effected in the same manner as in Example 1, except that butadiene and isoprene were used in such proportions as shown in Table 5. The results obtained were as set forth in Table 5.

Table 5

| Example No. | n-Hexane (g) | Vinyl chloride (mM) | Butadiene (g) | Isoprene (g) | Polymer yield (% by weight) | Isoprene* content in polymer (% by weight) | Intrinsic viscosity |
|---|---|---|---|---|---|---|---|
| 19 | 17.5 | 0.09 | 4.05 | 1.35 | 57 | 10 | 4.7 |
| 20 | 17.5 | 0.225 | 4.05 | 1.35 | 50 | 9 | 2.6 |
| 21 | 17.5 | 0.450 | 4.05 | 1.35 | 37 | 8 | 2.1 |

*The isoprene content was calculated according to infrared analysis of unfractionated polymer.

EXAMPLES 22–27

Polymerization was effected in the same manner as in Example 1, except that each of the solvents shown in Table 6 was used as the polymerization solvent in place of the n-hexane. The results obtained were as set forth in Table 6.

EXAMPLE 28

Polymerization was effected in the same manner as in Example 1, except that 3.96 mmol. of propenyl chloride was used in place of the vinyl chloride. The yield of the resulting polybutadiene was 53 % by weight and, according to infrared analysis, it was found that the polymer was composed of 65 % of trans-configuration, 32 % of vinyl configuration and 3 % of cis-configuration. The polymer had an intrinsic viscosity of 3.4 and a molecular weight of 530,000.

EXAMPLES 29–40

Table 6

| Example No. | Polymerization solvent (g) | Vinyl chloride (mM) | Butadiene (g) | Polymer yield (% by weight) | Intrinsic viscosity | Micro-structure of polymer | | |
|---|---|---|---|---|---|---|---|---|
| | | | | | | Trans | Vinyl | Cis |
| 22 | Cyclohexane 17.5 | 0.45 | 5.4 | 52 | 2.2 | 58 | 39 | 3 |
| 23 | Cyclohexane 17.5 | 0.090 | 5.4 | 75 | 5.0 | 60 | 38 | 2 |
| 24 | Benzene 17.5 | 0.45 | 5.4 | 19 | 2.6 | 67 | 30 | 3 |
| 25 | Benzene 17.5 | 0.090 | 5.4 | 35 | 5.4 | 69 | 30 | 1 |
| 26 | Chlorobenzene 17.5 | 0.225 | 5.4 | 24 | 2.3 | 66 | 33 | 1 |
| 27 | Chlorobenzene 17.5 | 0.090 | 5.4 | 26 | 3.0 | 67 | 31 | 2 |

Polymerization was effected in the same manner as in Example 1, except that the conditions shown in Table 7 were adopted. The results obtained were as set forth in Table 7.

Table 7

| Example No. | Monomer | (g) | Solvent | (g) | Cis-chloropropenyl (mM) | Polymerization time (hr.) | Yield (% by weight) | Intrinsic viscosity | Molecular weight × $10^{-4}$ |
|---|---|---|---|---|---|---|---|---|---|
| Control | Butadiene | (5.4) | n-Hexane | (17.5) | 0 | 2 | 100 | 22.0 | 865 |
| 29 | " | (") | " | (") | 0.876 | " | 79 | 8.8 | 236 |
| 30 | " | (") | " | (") | 1.75 | " | 66 | 6.2 | 145 |
| 31 | " | (") | " | (") | 3.96 | " | 53 | 3.4 | 61 |
| 32 | " | (") | " | (") | 8.12 | 19 | 45 | 2.2 | 33 |
| 33 | " | (") | Cyclohexane | (") | 4.00 | 3 | 51 | 3.2 | 56 |
| 34 | " | (") | Benzene | (") | 3.95 | 3 | 24 | 4.1 | 79 |
| 35 | Isoprene | (") | n-Hexane | (") | 2.25 | 22 | 28 | 1.9 | |
| 36 | " | (") | " | (") | 0.90 | 22 | 36 | 2.6 | |

Table 7-continued

| Example No. | Monomer (g) | Solvent (g) | Cis-chloro-propenyl (mM) | Polymerization time (hr.) | Yield (% by weight) | Intrinsic viscosity | Molecular weight × 10⁻⁴ |
|---|---|---|---|---|---|---|---|
| 37 | " (") | " (") | 0.45 | " | 60 | 5.2 | |
| Control | " (") | " (") | 0 | " | 100 | 20.5 | |
| 38 | Styrene-butadiene (") | " (") | 4.50 | " | 50 | 1.4 | |
| 39 | " (") | " (") | 2.25 | " | 59 | 1.9 | |
| 40 | " (") | " (") | 0.90 | 5 | 81 | 2.7 | |
| Control | " (") | " (") | 0 | 5 | 98 | 15.4 | |

EXAMPLES 41–45

Polymerization was effected in the same manner as in Example 1, except that β-bromostyrene was used as the molecular weight regulator in such amounts as shown in Table 8. The results obtained were as set forth in Table 8.

Table 8

| Example No. | Butadiene (g) | n-Hexane (g) | β-Bromostyrene (mM) | Yield (% by weight) | Intrinsic viscosity | Molecular weight × 10⁻⁴ |
|---|---|---|---|---|---|---|
| 41 | 5.4 | 17.5 | 0.037 | 100 | 15.1 | 520 |
| 42 | " | " | 0.077 | 94 | 12.9 | 400 |
| 43 | " | " | 0.113 | 62 | 12.4 | 380 |
| 44 | " | " | 0.153 | 75 | 11.2 | 290 |
| 45 | " | " | 0.230 | 14 | 2.2 | 33 |

The micro-structure of the polymer obtained in each example was composed of 65 % of trans, 32 % of vinyl and 3 % of cis.

EXAMPLES 46–47

Polymerization was effected in the same manner as in Example 1, except that isoprene was used in place of the butadiene, and β-bromostyrene was used as the molecular weight regulator in such amounts as shown in Table 9. The results obtained were as set forth in Table 9.

Table 9

| Example No. | Isoprene (g) | n-Hexane (g) | β-Bromostyrene (mM) | Yield (% by weight) | Intrinsic viscosity |
|---|---|---|---|---|---|
| Control | 5.4 | 17.5 | 0 | 99 | 21.0 |
| 46 | " | " | 0.036 | 58 | 11.8 |
| 47 | " | " | 0.077 | 69 | 11.1 |

EXAMPLES 48–85

In each of the examples shown below, the reaction was effected according to the following procedures:

17.5 g. of a dry solvent was fed to a 100 ml. glass pressure polymerization bottle which had been sufficiently filled with high purity nitrogen gas, and the bottle was tightly closed with a crown cap. To this bottle, 5.4 g. of a monomer and a given amount of a molecular weight regulator were added by use of a syringe, and then an alfin catalyst of 0.9 mmol. in terms of allyl sodium was added.

After shaking the bottle for a given period of time at room temperature (25°C.), the crown cap of the bottle was removed, and the content of the bottle was charged into 200 ml. of isopropyl alcohol containing 2 % by weight of an antioxidant, whereby the polymerization product was coagulated. The product was subjected 2 times to water-washing to remove the catalyst residue, washed with isopropyl alcohol and then dried for 24 hours under reduced pressure at 40°C. The results obtained were as set forth in Table 10.

Table 10

| Example No. | Monomer | Solvent | Molecular weight regulator (mM) | | Polymerization time (hr.) | Yield (% by weight) | Intrinsic viscosity | Molecular weight × 10⁻⁴ |
|---|---|---|---|---|---|---|---|---|
| Control | Butadiene | n-Hexane | Isopropenyl chloride | 0 | 2 | 100 | 21.4 | 805 |
| 48 | " | " | " | 0.45 | " | 87 | 13.2 | 410 |
| 49 | " | " | " | 0.90 | " | 77 | 6.5 | 155 |
| 50 | " | " | " | 2.25 | " | 65 | 4.8 | 100 |
| 51 | " | " | " | 4.50 | " | 63 | 4.4 | 90 |
| 52 | " | " | " | 9.00 | " | 46 | 3.7 | 73 |
| 53 | " | " | " | 18.00 | " | 36 | 3.4 | 65 |
| Control | Isoprene | " | " | 0 | " | 100 | 16.5 | — |
| 54 | " | " | " | 0.90 | " | 46 | 4.1 | — |
| 55 | " | " | " | 2.20 | 20 | 60 | 2.6 | — |
| 56 | " | " | " | 4.50 | " | 38 | 2.3 | — |
| 57 | " | " | " | 9.00 | " | 32 | 1.6 | — |
| 58 | Butadiene | Benzene | " | 2.25 | 2 | 32 | 7.3 | 180 |
| 59 | " | " | " | 4.50 | " | 28 | 5.5 | 124 |
| 60 | " | " | " | 6.75 | " | 25 | 4.8 | 100 |

Table 10-continued

| Example No. | Monomer | Solvent | Molecular weight regulator (mM) | | Polymerization time (hr.) | Yield (% by weight) | Intrinsic viscosity | Molecular weight × 10⁻⁴ |
| --- | --- | --- | --- | --- | --- | --- | --- | --- |
| 61 | " | Cyclohexane | " | 2.25 | " | 66 | 5.4 | 120 |
| 62 | " | " | " | 4.50 | " | 54 | 5.1 | 113 |
| 63 | " | " | " | 6.75 | " | 52 | 3.8 | 74 |
| 64 | " | n-Hexane | Cis-1,2-dichloroethylene | 0.061 | 5 | 73 | 9.0 | 245 |
| 65 | " | " | " | 0.097 | 24 | 18 | 3.3 | 72 |
| 66 | " | " | Trans-1,2-dichloroethylene | 0.045 | 2 | 85 | 8.6 | 230 |
| 67 | " | " | " | 0.057 | 5 | 79 | 7.1 | 175 |
| 68 | Butadiene | n-Hexane | Trans-1,2-dichloroethylene | 0.068 | 2 | 73 | 6.3 | 150 |
| 69 | " | " | " | 0.102 | 24 | 37 | 2.4 | 49 |
| 70 | Isoprene | " | " | 0.023 | 3 | 29 | 9.9 | — |
| 71 | " | " | " | 0.045 | 19 | 72 | 7.3 | — |
| 72 | " | " | " | 0.068 | 19 | 18 | 3.5 | — |
| 73 | Butadiene | Cyclohexane | " | 0.080 | 3 | 70 | 6.2 | 145 |
| 74 | " | Benzene | " | 0.080 | 3 | 30 | 5.4 | 120 |
| 75 | " | n-Hexane | Trichloroethylene | 0.045 | 2 | 75 | 11.7 | 350 |
| 76 | " | " | " | 0.068 | " | 48 | 6.9 | 170 |
| 77 | " | " | " | 0.090 | 20 | 24 | 4.3 | 86 |
| 78 | Isoprene | " | " | 0.045 | 2 | 56 | 11.8 | — |
| 79 | " | " | " | 0.090 | 20 | 60 | 7.7 | — |
| 80 | Butadiene | " | Tetrachloroethylene | 0.036 | 2 | 70 | 8.7 | 230 |
| 81 | " | " | " | 0.023 | " | 60 | 16.5 | 580 |
| 82 | " | " | " | 0.027 | " | 100 | 11.1 | 330 |
| 83 | " | " | Chloroprene | 0.090 | " | 83 | 16.1 | 560 |
| 84 | " | " | " | 0.180 | 3 | 65 | 10.1 | 285 |
| 85 | " | " | " | 0.270 | 24 | 32 | 7.0 | 172 |

What we claim is:

1. A process for producing a conjugated diolefinic polymer by polymerizing at least one conjugated diolefin monomer or copolymerizing at least one conjugated diolefin monomer with at least one vinyl aromatic hydrocarbon monomer in a hydrocarbon or halogenated hydrocarbon solvent in the presence of an alfin catalyst and a molecular weight regulator, the molecular weight regulator being a polyhalogenated unsaturated hydrocarbon selected from the group consisting of vinylidene chloride, vinylidene bromide, vinylidene iodide, vinylidene fluoride, 1,2-dichloroethylene, 1,2-dibromoethylene, 1,2-diiodoethylene, trichloroethylene, tribromoethylene, triiodoethylene, tetrachloroethylene, tetrabromoethylene, tetraiodoethylene, tetrafluoroethylene, 1-chloro-2-fluoroethylene, 1-chloro-2-bromoethylene, 1-chloro-1-fluoroethylene, 1,1-dichloro-1-propene, 1,1-dibromo-1-propene, 1,1-dichloro-1-butene and 1,1-dichloro-1-pentene.

2. A process according to claim 1, wherein the polyhalogenated unsaturated hydrocarbon is selected from the group consisting of vinylidene chloride, vinylidene iodide, vinylidene fluoride, cis-1,2-dichloroethylene, trans-1,2-dichloroethylene, 1,2-dibromoethylene, trichloroethylene, tribromoethylene, tetrachloroethylene and tetraboromoethylene.

3. A process for producing a conjugated diolefinic polymer by polymerizing at least one conjugated diolefin monomer or copolymerizing at least one conjugated diolefin monomer with at least one vinyl aromatic hydrocarbon monomer in a hydrocarbon or halogenated hydrocarbon solvent in the presence of an alfin catalyst and a molecular weight regulator, the molecular weight regulator being an alkenylidene halide having the formula,

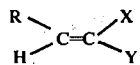

wherein R is a hydrogen atom or an alkyl group having 1 to 7 carbon atoms, and X and Y, which may be the same or different, are halogen atoms.

4. A process according to claim 1, wherein the molecular weight regulator is a vinylidene halide.

5. A process according to Claim 1, wherein the molecular weight regulator is used in an amount of 0.05 to 1,000 mmol. per 100 g. of the monomer.

6. A process according to Claim 1, wherein the conjugated diene is butadiene or isoprene or a mixture thereof.

7. A process according to Claim 1, wherein the vinyl aromatic hydrocarbon is styrene, divinylbenzene, α-methylstyrene, β-methylstyrene, 3-vinyltoluene, 1-vinylnaphthalene, 2-vinylnaphthalene, p-methoxystyrene or p-bromostyrene.

8. A process according to Claim 1, wherein butadiene is copolymerized with styrene.

9. A process according to Claim 1, wherein the reaction is effected at a temperature in the range of −50° to +150°C.

10. A process according to Claim 1, wherein the reaction is effected under a pressure of 1 to 5 atm.

11. A process according to Claim 1, wherein the reaction is effected in an atmosphere of an inert gas.

12. A process according to Claim 11, wherein the inert gas is argon, helium or nitrogen.

13. A process according to Claim 1, wherein the hydrocarbon solvent is an aliphatic hydrocarbon, an alicyclic hydrocarbon, an aromatic hydrocarbon or a partially hydrogenated aromatic hydrocarbon.

14. A process according to Claim 1, wherein the halogenated hydrocarbon solvent is methylene chloride, chloroform, carbon tetrachloride, trichlene, perchloroethylene, chlorobenzene, bromobenzene or chlorotoluene.

15. A process according to Claim 1, wherein the solvent is used in an amount of 1 to 100 times the weight of the monomer.

16. A process according to Claim 1, wherein the monomer is contacted with the alfin catalyst in the hydrocarbon solvent in the presence of the molecular weight regulator.

17. A process according to Claim 1, wherein the catalyst is used in an amount, in terms of allyl sodium, of 0.01 to 500 mmol. per 100 g. of the monomer.

18. A process according to Claim 17, wherein the amount of the catalyst is 0.1 to 100 mmol.

19. A process according to claim 13, wherein the aliphatic hydrocarbon is n-pentane, iso-pentane, n-hexane, n-heptane, n-octane or iso-octane; the alicyclic hydrocarbon is cyclohexane or cyclooctane; the aromatic hydrocarbon is benzene, toluene or xylene; and the partially hydrogenated aromatic hydrocarbon is tetralin.

* * * * *